Sept. 29, 1925. 1,555,482
A. PFLÜGER
APPARATUS FOR MAKING COG WHEELS
Filed Oct. 20, 1923 2 Sheets-Sheet 2

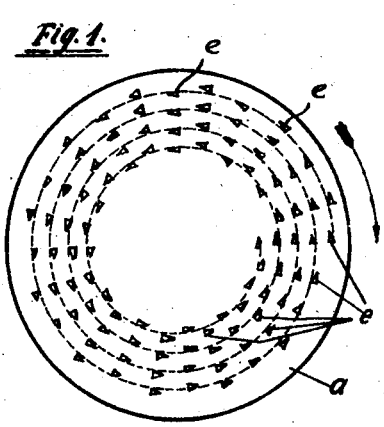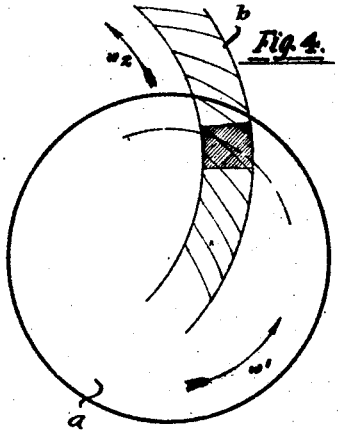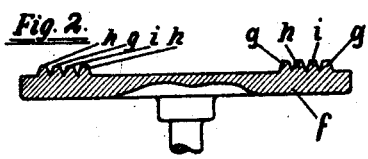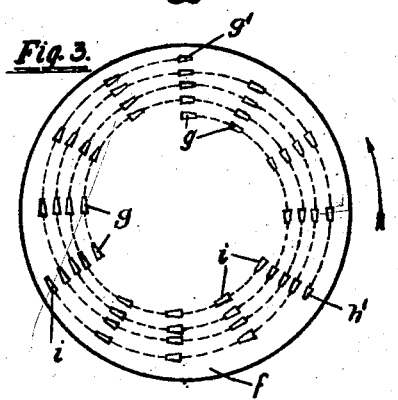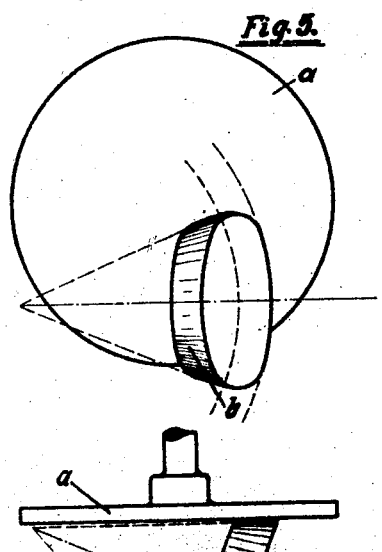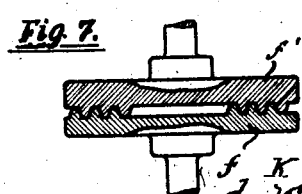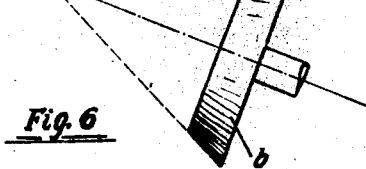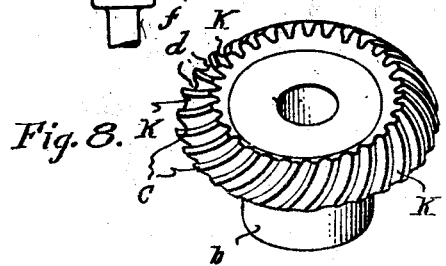

Inventor:
Albert Pflüger
by
Attorney.

Patented Sept. 29, 1925.

1,555,482

UNITED STATES PATENT OFFICE.

ALBERT PFLÜGER, OF ESSLINGEN, GERMANY.

APPARATUS FOR MAKING COG WHEELS.

Application filed October 20, 1923. Serial No. 669,772.

*To all whom it may concern:*

Be it known that I, ALBERT PFLÜGER, a citizen of Germany, residing at Esslingen, Germany, have invented certain new and useful Improvements in Apparatus for Making Cog Wheels, of which the following is a specification.

My invention relates to milling machines and more especially to face milling cutters for generating the teeth of cooperating bevel gears, and to the bevel gears cut with said cutters.

Each bevel gear is cut by a separate cutter. Each cutter is provided with teeth arranged on its face, so as to form a plurality of radial or substantially radial racks. The teeth of these successive racks are arranged in a spiral or in a plurality of spirals, the racks resembling the spokes of a wheel or the arms of a star and their teeth forming the spirals.

A pair of such cutters is required for cutting a pair of bevel gears, one cutter generating the teeth of one gear, the other one those of the other gear. The cutters rotate in opposite direction and the straight radial or substantially radial racks of each cutter are so arranged with regard to those of the co-operating cutter that the teeth of the racks in one cutter are opposite the tooth spaces of the racks in the other cutter and vice versa. In other words, any rack in one cutter is a counterpart of any rack in the other cutter.

The bevel gears cut by these cutters have teeth which when projected on a plane including the generatrix and the tangent of the teeth curves are curved on trochoids. However, a trochoid differs so little from arcs of a circle that they may as well be assumed to be such arcs. On the concave tooth faces the radius of the tooth curves is smaller along the addendum line than along the dedendum line while at the convex faces the radius is larger along the addendum line than along the dedendum line. The profile thus obtained is exactly symmetrical to the radius only at the centre of the length of teeth of the bevel gear while the profile is inclined toward the concave side of the tooth curve at both ends of the teeth. In consequence thereof the faces of the generated teeth are not equidistant on their entire length. However this is not a drawback but an advantage inasmuch as the teeth mesh practically at the centre of their length only and the pressure at the ends of the teeth is relieved so that the gears run very smoothly.

The new face milling cutters may be inserted in any hobbing miller, the teeth of each gear being generated by the corresponding cutter in a continuous operation. Bevel gears having any number of teeth and designed for any ratio of transmission may be cut with a single pair of these cutters.

In the drawings affixed to this specification and forming part thereof face milling cutters embodying my invention and a bevel gear cut with the aid of one such cutter are illustrated diagrammatically by way of example.

In the drawings

Fig. 1 is an end elevation of a cutter the teeth of which are arranged in a single spiral, Fig. 2 is a section and Fig. 3 an end elevation of a cutter the teeth of which are arranged in a plurality of concentric spirals.

Fig. 4 indicates diagrammatically the generation of the teeth of a bevel gear,

Fig. 5 is an elevation showing a bevel gear blank, and a cutter generating teeth in said blank, Fig. 6 is a plan view of the parts shown in Fig. 5, Fig. 7 is a cross section of two cooperating cutters in the plane of two diametrically opposite racks, the cutters being shown in contact with their front faces in order to illustrate the relation of their cutting edges.

Figure 8:
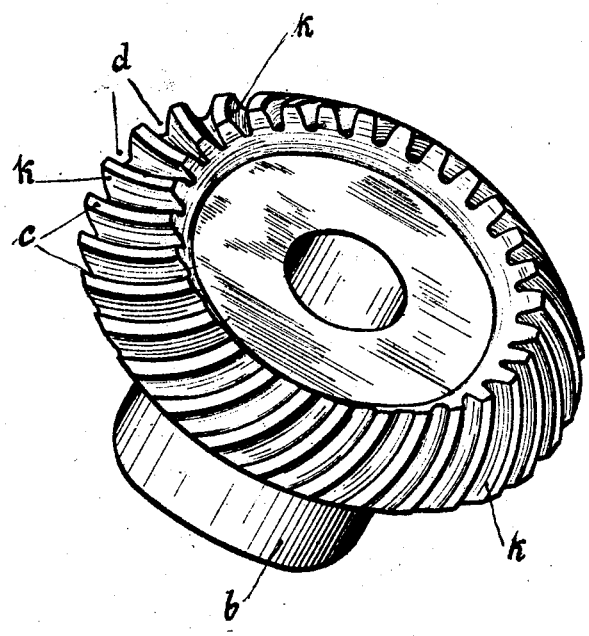
Fig. 8 is an isometric view of a bevel gear cut with one of my novel cutters.

The milling or cutting procedure involves continuous rolling contact between the wheel blank and the milling cutter, teeth of the wheel being formed successively in a continuous operation. The milling cutter $a$ rotates with the uniform angular velocity $w^1$ in the direction of the arrow (Fig. 4), the wheel $b$ with the uniform angular velocity $w^2$, the ratio of $w^1:w^2$ being $= z:i$, that is equal to the number of teeth $i$ of the wheel, divided by the number $i$ of spirals of the milling cutter. The space $d$ between each pair of adjoining teeth of the wheel is, therefore, acted upon by the spiral or spirals of the milling cutter. As shown in Fig. 1 the teeth $e$ of the cutter $a$ are arranged in radial or substantially radial lines forming a plurality of successive racks and the teeth of all racks are arranged on a continuous spiral. The cutter $f$ illustrated in Figs. 2 and 3 is of similar construction but in this case the teeth are arranged in three concentric spirals, one of these spirals extending from $g$ to $g'$, the other from $h$ to $h'$ and the third from $i$ to $i'$ in Fig. 3.

As will appear from Fig. 8, the profiles of the teeth are not symmetrical to the corresponding radii except at the centre of the length of teeth so that the teeth are in full mesh only at their centres, thereby causing the teeth to run smoothly.

The cutter for the other bevel gear of the pair rotates in opposite direction to the first cutter and its spiral or spirals is or are of opposite hand to the first cutter but otherwise its construction and operation are similar.

I wish it to be understood that I do not desire to be limited to the exact details of construction shown and described, for obvious modifications will occur to a person skilled in the art.

I claim:—

1. Equipment for milling machines for generating the teeth of co-operating bevel gears comprising two face milling cutters for each pair of bevel gears and, teeth on said cutters arranged in spirals extending in opposite directions, the teeth of each cutter fitting the tooth spaces of the other cutter, and vice versa, whereby each of said cutters when rotating in opposite direction to that of the other cutter, generates the teeth of a corresponding gear blank.

2. Equipment for milling machines for generating the teeth of co-operating bevel gears, comprising two face milling cutters for each pair of bevel gears and, teeth on said cutters arranged in spirals extending in opposite directions, the teeth of each cutter fitting the tooth spaces of the other cutter, and vice versa, whereby each of said cutters when rotating in opposite direction to that of the other cutter, generates the teeth of a corresponding gear blank.

3. Equipment for milling machines for generating the teeth of co-operating bevel gears comprising two face milling cutters for each pair of bevel gears and, teeth on said cutters arranged in spirals extending in opposite directions, the cutting edges of said teeth being arranged in radial, straight rows, the teeth of each cutter fitting the tooth spaces of the other cutter, and vice versa, whereby each of said cutters when rotating in opposite direction to that of the other cutter, generates the teeth of a corresponding gear blank.

4. Equipment for milling machines for generating the teeth of co-operating bevel gears comprising two face milling cutters for each pair of bevel gears and, teeth on said cutters arranged in spirals extending in opposite directions, the cutting edges of said teeth being arranged in substantially radial, straight rows, the teeth of each cutter fitting the tooth spaces of the other cutter, and vice versa, whereby each of said cutters when rotating in opposite direction to that of the other cutter, generates the teeth of a corresponding gear blank.

5. Equipment for milling machines for generating the teeth of co-operating bevel gears comprising two face milling cutters for each pair of bevel gears and, teeth on said cutters arranged in spirals extending in opposite directions, the cutting edges of said teeth being arranged in radial, straight rows, the rows of teeth of each cutter fitting the rows of tooth spaces of the other cutter, and vice versa, whereby each of said cutters when rotating in opposite direction to that of the other cutter, generates the teeth of a corresponding gear blank.

6. Equipment for milling machines for generating the teeth of co-operating bevel gears comprising two face milling cutters for each pair of bevel gears and, teeth on said cutters arranged in spirals extending in opposite directions, the cutting edges of said teeth being arranged in substantially radial, straight rows, the rows of teeth of each cutter fitting the rows of tooth spaces of the other cutter, and vice versa, whereby each of said cutters when rotating in opposite direction to that of the other cutter, generates the teeth of a corresponding gear blank.

7. Equipment for milling machines for generating the teeth of co-operating bevel gears comprising two face milling cutters for each pair of bevel gears and, teeth on said cutters arranged in spirals extending in opposite directions, the cutting edges of said teeth being arranged in racks the cutting edges of which are parallel in both cutters, the teeth of each cutter fitting the tooth spaces of the other cutter, and vice versa, whereby each of said cutters when rotating in opposite direction to that of the other cutter, generates the teeth of a corresponding gear blank.

8. Equipment for milling machines for generating the teeth of co-operating bevel gears comprising two face milling cutters for each pair of bevel gears and, teeth on said cutters arranged in spirals extending in opposite directions, the cutting edges of said teeth being arranged in racks of identical pitch, the cutting edges of which are congruent in both cutters, the teeth of each cutter fitting the tooth spaces of the other cutter, and vice versa, whereby each of said cutters when rotating in opposite direction to that of the other cutter, generates the teeth of a corresponding gear blank.

9. Equipment for milling machines for generating the teeth of co-operating bevel gears comprising two face milling cutters for each pair of bevel gears and, teeth on said cutters arranged in spirals extending in opposite directions, the cutting edges of said teeth being arranged in racks the right and left cutting edges of which are parallel respectively in both cutters, the teeth of the racks of each cutter fitting the tooth spaces of the racks of the other cutter, and vice versa, whereby each of said cutters when rotating in opposite direction to that of the other cutter, generates the teeth of a corresponding gear blank.

10. Equipment for milling machines for generating the teeth of co-operating bevel gears comprising two face milling cutters for each pair of bevel gears and, teeth on said cutters arranged in spirals extending in opposite directions, the cutting edges of said teeth being arranged in racks of identical pitch, the cutting edges of which are congruent in both cutters, the teeth of the racks of each cutter fitting the tooth spaces of the racks of the other cutter, and vice versa, whereby each of said cutters when rotating in opposite direction to that of the other cutter, generates the teeth of a corresponding gear blank.

In testimony whereof I affix my signature.

ALBERT PFLÜGER.